United States Patent
Fedgenhaeuer et al.

(10) Patent No.: US 10,197,431 B2
(45) Date of Patent: Feb. 5, 2019

(54) DEVICE FOR MEASURING THE FILLING LEVEL OF A LIQUID

(71) Applicant: Hella KGaA Hueck & Co., Lippstradt (DE)

(72) Inventors: Silvio Fedgenhaeuer, Bremen (DE); Sergej Tonewizki, Diepholz (DE); Ingo Zoyke, Stuhr-Moordeich (DE); Adam Sklorz, Ganderkesee (DE)

(73) Assignee: HELLA KGAA HUECK & Co., Lippstadt (DE)

(*) Notice: Subject to any disclaimer, the term of this patent is extended or adjusted under 35 U.S.C. 154(b) by 147 days.

(21) Appl. No.: 15/469,264

(22) Filed: Mar. 24, 2017

(65) Prior Publication Data

US 2017/0284850 A1  Oct. 5, 2017

(30) Foreign Application Priority Data

Mar. 30, 2016 (DE) .......................... 10 2016 003 657

(51) Int. Cl.
*G01F 23/296* (2006.01)
*F01M 11/12* (2006.01)

(52) U.S. Cl.
CPC .......... *G01F 23/296* (2013.01); *F01M 11/12* (2013.01)

(58) Field of Classification Search
CPC ............ G01F 23/2962; G01F 23/2968; G01N 2291/02836
See application file for complete search history.

(56) References Cited

U.S. PATENT DOCUMENTS

| | | | | |
|---|---|---|---|---|
| 5,184,510 A | * | 2/1993 | Rossman | G01F 23/0076 73/1.73 |
| 5,877,997 A | * | 3/1999 | Fell | G01F 23/2962 367/908 |
| 6,393,922 B1 | | 5/2002 | Winterer | |
| 6,629,457 B1 | | 10/2003 | Keller | |

(Continued)

FOREIGN PATENT DOCUMENTS

| | | |
|---|---|---|
| CN | 201748957 U | 2/2011 |
| DE | 197 03 206 A1 | 7/1998 |

(Continued)

OTHER PUBLICATIONS

Epoxy resin adhesives for high temperature applications, DELO Company, Mar. 18, 2015 https://www.delo.de/fileadmin/user_upload/documents/de/brochures/Epoxidharz-Klebstoffe_fuer_Hochtemperatur-Anwendungen_DE.pdf (last retrieved on Mar. 29, 2017).

(Continued)

*Primary Examiner* — David A Rogers
(74) *Attorney, Agent, or Firm* — Muncy, Geissler, Olds & Lowe, P.C.

(57) ABSTRACT

A device for measuring the filling level of a liquid in a container with an ultrasound sensor and electronic components attached to the ultrasound sensor. A damping cup is arranged above the ultrasound sensor. The electronic components attached to the ultrasound sensor are separated from the liquid to be measured by a cover arranged above the electronic components. The cover has a recess in the vicinity of the ultrasound sensor, rests against the ultrasound sensor with the rim of the recess and is sealingly glued to the same.

11 Claims, 3 Drawing Sheets

(56) References Cited

U.S. PATENT DOCUMENTS

| | | | |
|---|---|---|---|
| 6,993,967 B2* | 2/2006 | Forgue | G01F 23/2962 73/1.82 |
| 7,117,738 B2* | 10/2006 | Miyagawa | G01F 23/2962 73/290 V |
| 7,370,527 B2* | 5/2008 | Miyagawa | G01F 23/2962 73/290 V |
| 7,954,384 B2 | 6/2011 | Koehler et al. | |
| 7,966,136 B2* | 6/2011 | Reimer | G01F 25/0061 702/55 |
| 8,191,423 B2 | 6/2012 | Chiou et al. | |
| 8,276,445 B2 | 10/2012 | Reiche | |
| 8,555,716 B2 | 10/2013 | Niemann et al. | |
| 8,596,139 B2 | 12/2013 | Mueller et al. | |
| 8,899,109 B2* | 12/2014 | Niemann | G01F 23/2962 73/290 V |
| 9,006,847 B2 | 4/2015 | Welter et al. | |
| 9,087,504 B2 | 7/2015 | Mueller et al. | |
| 9,163,974 B1 | 10/2015 | Kekäläinen | |
| 2009/0301187 A1* | 12/2009 | Beyer | G01F 23/296 73/290 V |
| 2009/0314575 A1 | 12/2009 | Reiche | |
| 2010/0089169 A1 | 4/2010 | Koehler et al. | |
| 2010/0262386 A1* | 10/2010 | Reimer | G01F 23/2962 702/55 |
| 2011/0005326 A1* | 1/2011 | Bentley | G01L 19/148 73/754 |
| 2012/0174680 A1 | 7/2012 | Wade et al. | |
| 2013/0221458 A1 | 8/2013 | Walter et al. | |
| 2013/0270749 A1 | 10/2013 | Hachtmann et al. | |
| 2014/0060177 A1* | 3/2014 | Kline | G01F 23/2962 73/290 V |
| 2014/0352426 A1 | 12/2014 | Kuehnel et al. | |
| 2015/0090018 A1 | 4/2015 | Niemann et al. | |
| 2015/0377684 A1 | 12/2015 | Strackerjan et al. | |
| 2016/0331284 A1* | 11/2016 | Pace | A61B 5/14503 |

FOREIGN PATENT DOCUMENTS

| | | | |
|---|---|---|---|
| DE | 199 42 378 A1 | 3/2001 | |
| DE | 100 57 397 A1 | 5/2002 | |
| DE | 10 2005 006 753 A1 | 8/2006 | |
| DE | 10 2005 043 263 A1 | 3/2007 | |
| DE | 10 2006 040 344 A1 | 3/2008 | |
| DE | 10 2006 059 741 A1 | 7/2008 | |
| DE | 10 2007 014 539 A1 | 10/2008 | |
| DE | 10 2007 014 540 A1 | 10/2008 | |
| DE | 20 2008 011 684 U1 | 12/2008 | |
| DE | 10 2008 017 183 A1 | 10/2009 | |
| DE | 10 2008 055 126 A1 | 7/2010 | |
| DE | 10 2009 036 888 A1 | 12/2010 | |
| DE | 10 2009 046 148 A1 | 5/2011 | |
| DE | 10 2010 011 490 A1 | 9/2011 | |
| DE | 10 2010 039 599 A1 | 2/2012 | |
| DE | 11 2011 101 128 T5 | 2/2013 | |
| DE | 10 2012 200 757 A1 | 7/2013 | |
| DE | 10 2012 002 011 A1 | 8/2013 | |
| DE | 10 2012 004 932 A1 | 9/2013 | |
| DE | 102012004932 A1 * | 9/2013 | ........... G01F 23/296 |
| DE | 10 2012 014 307 A1 | 1/2014 | |
| DE | 10 2013 016 164 A1 | 4/2015 | |
| DE | 10 2014 009 543 A1 | 12/2015 | |
| DE | 10 2014 009 610 A1 | 12/2015 | |
| JP | 2004-101353 A * | 4/2004 | |
| JP | 2004-294073 A * | 10/2004 | |
| JP | 2004-347378 A * | 12/2004 | |

OTHER PUBLICATIONS

Habenicht, Gerd, "Plastics and other non-metallic materials" Bonding: Basics, technologies,applications, 2009, pp. 645-737.

Habenicht, Gerd, "Constructive design of metal bonding" Bonding: Basics, technologies, applications, 2009, pp. 529-537.

* cited by examiner

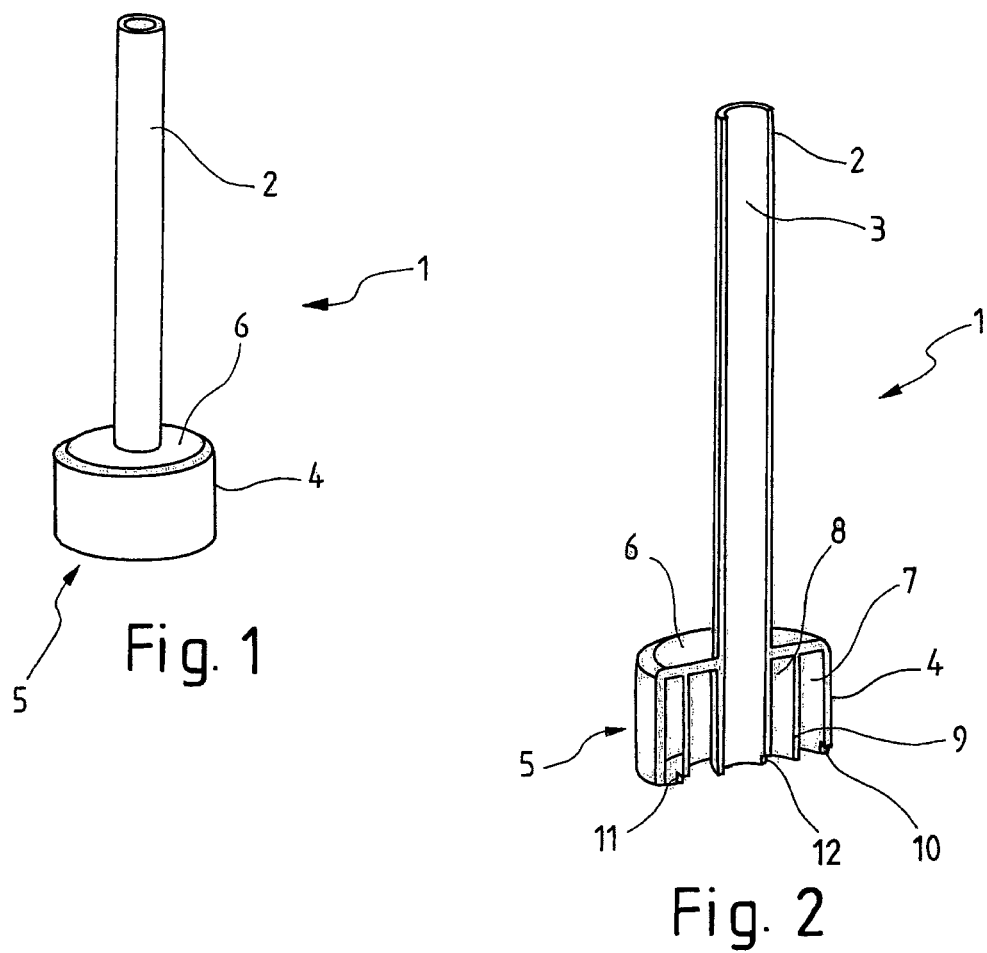

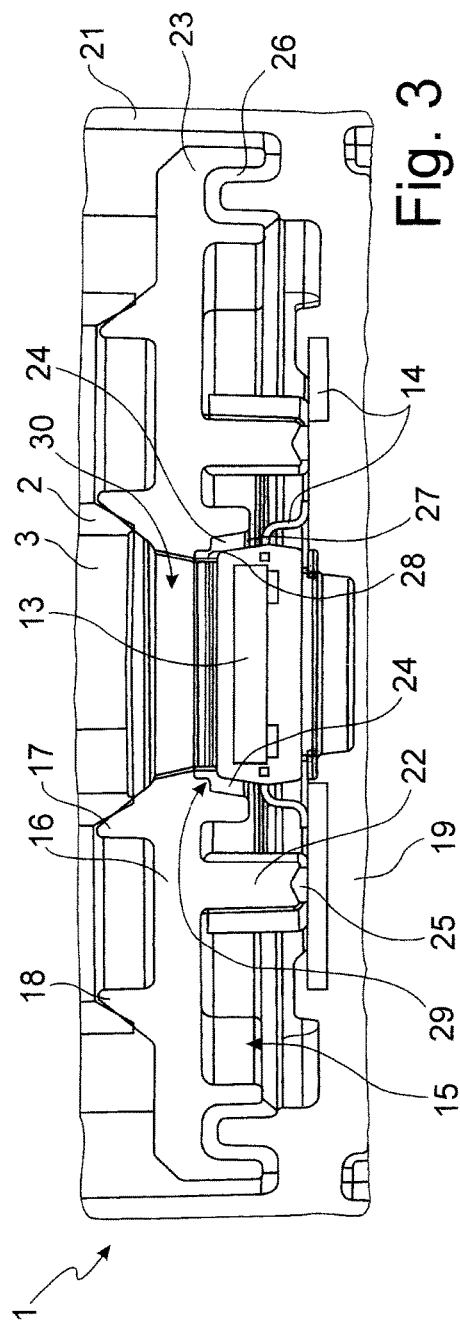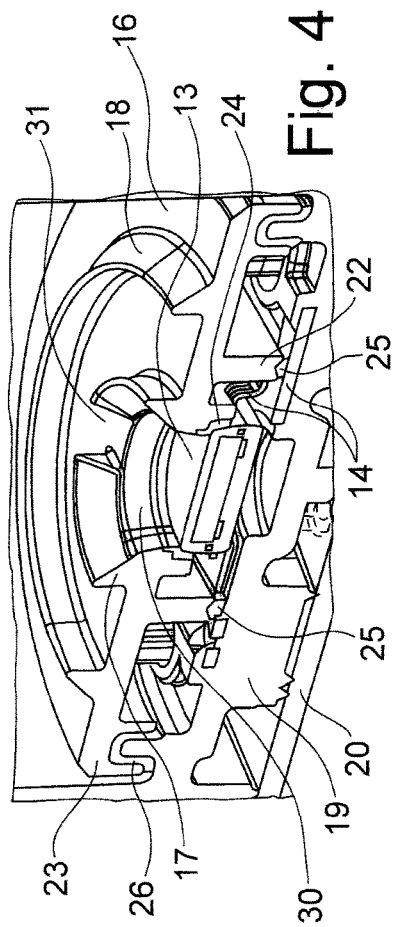

DEVICE FOR MEASURING THE FILLING LEVEL OF A LIQUID

BACKGROUND OF THE INVENTION

Field of the Invention

The invention relates to a device for measuring the filling level of a liquid in a container with an ultrasound sensor and electronic components attached to the ultrasound sensor, wherein a damping cup is arranged above the ultrasound sensor.

Brief Discussion of the Related Art

A device of this kind has been described for example in the DE 10 2014 009 610 A1. Such devices are used in particular for measuring the filling level of engine oil in an oil-lubricated engine, in particular in a motor vehicle. The filling level of the liquid is ascertained with the aid of ultrasound sensors. These emit sound waves, which are reflected at the interface between two media, here between air and oil, and which are received back by the ultrasound sensor. The recorded travel time of the sound waves is then used as a basis for ascertaining the filling level in the container holding the liquid. With a running engine, in particular in a motor vehicle, it is difficult, however, to ascertain the filling level of the oil, because the oil is very foamy and the sound waves are reflected at the gas bubbles in the oil. The values detected therefore vary widely across a wide area. In order to obtain measurements which can be evaluated, a unique interface is required between the gaseous medium such as air in this case, and the oil. In order to achieve this, the ultrasound sensors have so-called damping cups assigned to them. The damping cups usually comprise an ante-chamber. Within these damping cups, which surround the measuring section of the ultrasound sensor, the liquid to be measured is calmed and its connection to the container is limited to merely a small opening in the damping cup to the container. Due to the small opening in the damping cup to the container the amount of gas bubbles reaching the damping cup is reduced. The damping cups also serve to retard fluctuations generated e.g. by acceleration or by driving through bends and to take the mean of resulting fluctuations. In order to ensure maximum service life for the device, the ultrasound sensor with its electronic components is overmoulded in one known embodiment using a thermosetting plastic. In order to ensure that subsequent assembly processes can be carried out, the electrical connections are excluded from the overmoulding process.

SUMMARY OF THE INVENTION

The invention is based on the requirement to propose a device of the kind mentioned in the beginning, which is particularly robust and long-lasting. This requirement is met with a device having the characteristics of patent claim 1. Advantageous developments are proposed in the subclaims.

With a device for measuring the filling level of a liquid in a container comprising an ultrasound sensor and electronic components connected to the ultrasound sensor, wherein a damping cup is arranged above the ultrasound sensor, provision is made according to the invention for the electronic components connected to the ultrasound sensor to be separated from the liquid to be measured by a cover arranged above the electronic components, for the cover to comprise a recess in the vicinity of the ultrasound sensor and for the cover with the edge of the recess to rest against the ultrasound sensor and to be sealingly glued to the same. In this way a protected space is created around the ultrasound sensor and in particular below the same, which is sealed against the medium above it or against the liquid above it. The electronic components may be circuit elements and/or electrical lines and connections.

In the outer area the cover is also glued to a bottom arranged below it, so that cavities are created in which electronic components are arranged which are associated with the ultrasound sensor. As a result the electronic components and also their terminals and connections do not reside in the liquid to be measured, in particular not in the oil, and are therefore not attacked. Furthermore, with this embodiment there is no danger that any materials, which may be encasing the electronic components, may become detached due to vibrations or temperature fluctuations.

The cover is preferably configured as a circular disc with a central recess. This embodiment ensures that the cover is well adapted to the device. The central recess is provided for connection to the ultrasound sensor, enabling the ultrasound sensor to emit through this recess and allowing the ultrasound waves to reach the damping cup arranged above it.

With a preferred development of the invention the top of the cover forms the bottom of the damping cup. The damping cup can then be produced as a part which is open at the bottom and which is placed on top of the cover. On its top the cover is preferably equipped with holding structures for attaching the damping cup. In particular, the holding structures are formed as ring-shaped elevations, against which corresponding walls of the damping cup rest. In particular two ring-shaped elevations or annular edges surrounding each other are provided, between which an antechamber is formed within the damping cup. Furthermore the cover, on its top, conveniently comprises structures for forming an antechamber in the damping cup.

With another preferred development of the invention the cover, at its bottom, comprises downwardly extending structures perpendicular to the cover plane, which are attached, in particular glued, to the bottom. Gluing is in particular effected with a flange, which at the bottom can be inserted into the respective container, in which the filling level is measured. The whole device is preferably mounted onto a flange, which can be inserted, in particular inserted from below, into the container with the liquid to be measured. The device with the damping cup then extends preferably vertically upwards.

Below the cover liquid-free spaces are preferably formed, which house the electronic components and in which the electrical connection to the ultrasound sensor extends. In this case there is no need for overmoulding the electrical connections and the electronic components, since protection against the liquid to be measured is provided by the cover.

With another preferred development of the invention the cover at the central recess is provided with a roughly vertical section extending along the side of the ultrasound sensor, and a horizontal section extending to a certain extent across the ultrasound sensor. As a result the cover is, to some extent, guided around the upper corner of the ultrasound sensor, so that in this area a narrow area enclosing the upper rim of the ultrasound sensor is formed, in which an adhesive connection is made between the ultrasound sensor and the cover. Especially preferably the cover in this rim area, comprises a projection, which lies directly adjacent to the upper rim edge of the ultrasound sensor and in which the distance between the ultrasound sensor and the cover is minimal. This design results in a particularly effective adhesive connection.

With another preferred development of the invention the recess in the cover above the ultrasound sensor is configured as an opening. Here the cover rests against the ultrasound sensor and is continuously connected to the same by means of a ring-shaped adhesive connection. This ensures that the cover is altogether tight again, since the recess, which preferably is circular, is closed due to the ultrasound sensor arranged in the recess and the ring-shaped adhesive connection between the ultrasound sensor and the recess, specifically the rim of the recess.

A further aspect of the invention relates to an oil-lubricated engine wherein the engine comprises an above-described device for measuring the engine oil level. In other respects the invention relates to a motor vehicle with the above-mentioned device, in particular with the previously mentioned oil-lubricated motor.

BRIEF DESCRIPTION OF THE DRAWINGS

The invention will now be described in more detail by way of the embodiment depicted in the drawing. In detail, in the schematic representations:

FIG. 1 shows a schematic view of a device according to the invention;

FIG. 2 shows a sectional view of a damping cup of the device according to the invention;

FIG. 3 shows a sectional view through a lower area of the device according to the invention with ultrasound sensor and cover;

FIG. 4 shows a perspective view of FIG. 3;

DETAILED DESCRIPTION OF THE PREFERRED EMBODIMENTS

Figure 5:
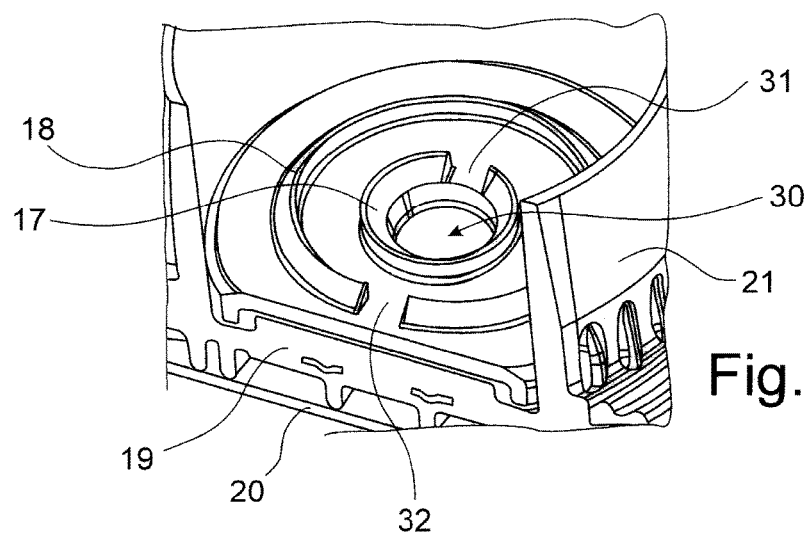
FIG. 5 shows a perspective view in another section through the lower part of the device according to the invention.

FIG. 1 shows a device 1, which in its upper area comprises a damping cup 2, inside which a measuring section extends. The ultrasound sensor not visible here emits ultrasound waves within this measuring section. In the lower area of the device 1 the damping cup comprises a pre-volume or antechamber 5. This antechamber 5 here essentially has an outer wall 4 and a lid 6.

FIG. 2 shows a cross-section through the upper part of the device 1 with the damping cup 2. The measuring section 3, at the bottom of which the ultrasound sensor not shown here is arranged, extends through the measuring section 2. Here the antechamber 5 consists of an inner ring 8 and an outer ring 7. These are formed by the outer wall 4 and an inner wall 9. In the view according to FIG. 2 the inflow 10 for the entry of the liquid from the container into the antechamber 5 can be recognised. This initially leads into the inner ring 7. The inflow 10 is essentially a breakthrough through the outer wall 4. This is located close to the bottom, in particular directly adjacent to the bottom of the device 1. The liquid can enter through an inflow 11 from the outer ring 7 into the inner ring 8. The inflow 11 is offset by 180° from the inflow 10. The liquid is then able to get into the measuring section 3 from the inner ring 8 through an inflow 12. The inflow into the measuring section 3 is offset by 180° from the inflow 11. Due to this arrangement of the inflows 10, 11 and 12 it is ensured that the liquid travels for a maximum possible distance in the antechamber 5, during which time it is calmed and outgassed thus resulting in a minimum of gas bubbles in the liquid, on which the ultrasound waves could reflect and interfere with the measuring result.

FIG. 3 shows a cross-section through the lower part of the device 1, in particular through the bottom area of the antechamber, which is not shown in FIGS. 1 and 2. In particular this figure shows the ultrasound sensor 13 with its electronic contacts 14, which are connected in downward direction. The electronic contacts 14 are part of the electronic components connected to the ultrasound sensor 13. The ultrasound sensor 13 is mounted onto a lower flange 19 and mounted centrally below the damping cup 2 and emits within the damping cup 2 into the vertically upward directed measuring section 3. Essential to the present invention is the cover 16 provided here, which comprises a central recess 30, which as regards size essentially corresponds to the diameter of the measuring section 3. The cover 16 with the recess 30, which could also be called a freed-up space, is configured and positioned such that the ultrasound sensor 13, the recess 30 and the measuring section 3 are arranged one above another and in alignment with each other. The cover 16 comprises ring-shaped structures on its top, which are used for connection to the antechamber 5. An inner annular edge 17 and an outer annular edge 18 are provided here, in particular. The inner annular edge 17 is joined here to the wall 2 of the damping cup. The outer annular edge 18 is joined to the inner wall 9 of the antechamber. Preferably the inner annular edge 17 is chamfered or sloped towards the inside and the outer annular edge 18 is chamfered or sloped towards the outside. Conversely the lower rim of the damping cup 2 is chamfered outwards, and the lower rim of the inner wall 9 is chamfered inwards. The chamfers correspond to each other, respectively. This leads to an automatic self-adjustment during assembly of the damping cup 2 with the antechamber 5 on the cover 16. Moreover the cover 16 comprises lower projections 22 and is connected here via an adhesive connection 26 to the flange 19. In the rim area of the cover 16 there is provided a connection area 23 of the cover 16 to the flange 19. Here an adhesive connection 26 is established between the cover 16 and the flange 19 using basically known construction and assembly technology. In the area of the recess 30 an adhesive connection 24 is provided between the cover 16 and the ultrasound sensor 13. This is provided in the shape of a ring around the upper outer edge of the ultrasound sensor 13. On the rim of the recess 30 a vertical part 27 and a horizontal part 28 of the cover can be recognised, which surround this upper rim of the ultrasound sensor 13. This produces an approximately uniform area for the adhesive connection 24 both horizontally and vertically. The vertical area is however distinctly longer than the horizontal area 28. Moreover the rim of the recess 30 shows a step 29 in the cover 16, which represents the minimum distance between the edge of the ultrasound sensor 13 and the cover 16. This allows a particularly good distribution of the adhesive compound in the area of the adhesive connection 24. For due to capillary forces substantially less adhesive spreads from the vertical part 27 onto the ultrasound sensor 13, thereby forming a particularly good adhesive connection.

FIG. 4 is a perspective sectional view onto the lower area of the device 1, which roughly corresponds to the area depicted in FIG. 3. Identical parts have been marked with identical reference symbols. Here the view upon the cover 16 is more from the top, so that, in particular the inner annular edge and the outer annular edge can be recognised. The inner annular edge 17 comprises a breakthrough 31, through which the liquid to be measured, in particular the oil, reaches the measuring section 3. Also the recess 30 or freed-up space and the adhesive connection 24 circumventing the recess 30 like a ring between the cover 16 and the ultrasound sensor 13 can be recognised here.

FIG. 5 shows a perspective view of the lower part of the device 1. This figure corresponds more or less to FIGS. 3 and 4, but it is viewed from a different perspective and using a different section. In particular the inner annular edge 17 with the breakthrough 31 and the outer annular edge 18 with the breakthrough 32 can be recognised. The breakthroughs 31 and 32 are offset by 180° from one another, so that the liquid dwells for a maximum duration in the ante-chamber 5. Furthermore it shows the flange ring 21, which was merely indicated in FIGS. 3 and 4. The outer wall 4 of the antechamber 5 is placed onto this outer flange ring 21. To this end it is convenient if the outer wall 4, different from the view in FIG. 2, is shorter than the inner wall 9 and the wall of the damping cup 2, i.e. if it does not extend as far in downward direction.

Figure 6:
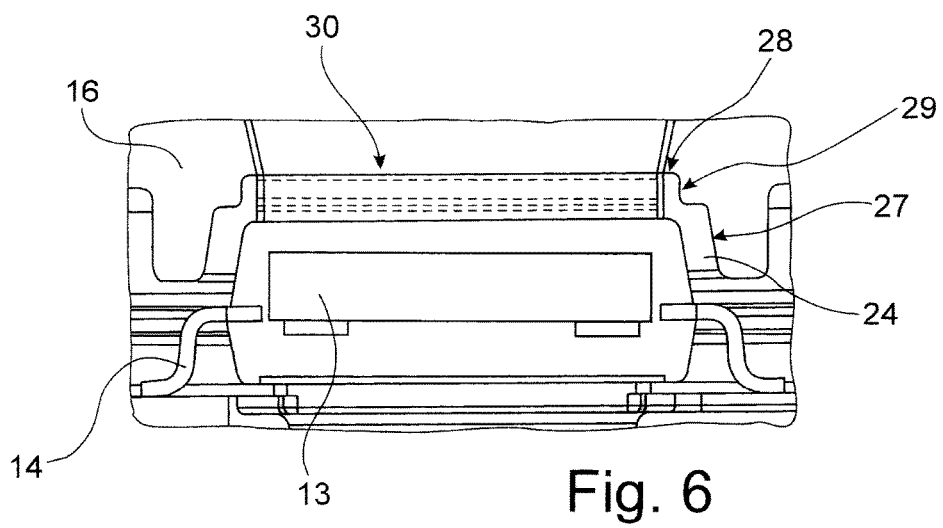
FIG. 6 shows an enlarged view of the ultrasound sensor with the cover arranged above it and the ring-shaped adhesive connection.

FIG. 6 shows an enlarged cross-section in the area of the ultrasound sensor 13. The ultrasound sensor 13 can be recognised here with its contacts 14. The cover 16 extends at the rim and around the ultrasound sensor 13. The cover comprises the central recess 30 so that the ultrasound sensor 13 can emit in an upward direction and can receive from above. Between the cover 16 and the ultrasound sensor 13, in particular in the area of the upper annular edge or, in cross-section of the upper corner of the ultrasound sensor 13, the cover 16 and the ultrasound sensor 13 are in close proximity to each other, and this is also where the adhesive connection 24 is formed, with which the cover 16 is sealingly connected to the ultrasound sensor 13. The cover 16, to this end, comprises a vertical part 27 on the rim of the recess 30, which extends parallel to a part of the side wall of the ultrasound sensor 13. Furthermore the cover 16 comprises a horizontal part 28 shorter relative to this vertical part 27, wherein the horizontal part 28, within a short rim area, extends across the ultrasound sensor 13. In the transition area between this vertical part 27 and the horizontal part 28 a step 29 of the cover 16 is provided on the rim of the recess 30. This could also be called a C-groove. Here, due to a kind of projection in the cover, a projection comparable in shape and size to the corner of the ultrasound sensor 13 is formed, which lies opposite the upper corner of the ultrasound sensor 13 thus representing a minimum distance for forming an adhesive connection. In the area of this step 29 of the cover 16 the thickness of the adhesive connection 24 is approximately only half the thickness of the adhesive connection 24 at the widest point from the ultrasound sensor 13 to the horizontal part 28 of the cover 16.

All features mentioned in the above description and in the claims can be combined at random with the features of the independent claim. The disclosure of the invention is thus not limited to the described or claimed feature combinations, rather all feature combinations meaningful in terms of the invention are considered to have been disclosed.

The invention claimed is:

1. A device for measuring the filling level of a liquid in a container with an ultrasound sensor and electronic components attached to the ultrasound sensor, wherein a damping cup is arranged above the ultrasound sensor,
   wherein
   the electronic components attached to the ultrasound sensor are separated from the liquid to be measured by a cover arranged above the electronic components,
   the cover comprises a recess in the vicinity of the ultrasound sensor, and
   the cover with the rim of the recess rests against the ultrasound sensor and is sealingly glued to the same.

2. The device according to claim 1, wherein the top of the cover forms the bottom of the damping cup.

3. The device according to claim 1, wherein the top of the cover comprises holding structures for attaching the damping cup.

4. The device according to claim 1, wherein the cover is configured as a circular disc with a central recess.

5. The device according to claim 1, wherein the cover on its top comprises structures for forming an antechamber of the damping cup.

6. The device according to claim 1, wherein the cover on its bottom comprises downwardly extending steps perpendicular to the longitudinal plane of the cover, which are attached to its bottom.

7. The device according to claim 1, wherein liquid-free spaces are formed below the cover, which house the electronic components and electronic connections to the ultrasound sensor.

8. The device according to claim 1, wherein the cover on the rim of the recess comprises an approximately vertical section extending along the side of the ultrasound sensor, and a horizontal section extending across the ultrasound sensor roughly in horizontal direction.

9. The device according to claim 1, wherein the recess in the cover above the ultrasound sensor is formed as an opening and the cover rests against the ultrasound sensor by means of a ring-shaped adhesive connection.

10. An oil-lubricated engine, wherein the engine comprises a device according to claim 1.

11. A motor vehicle, wherein the motor vehicle comprises a device according to claim 1.

\* \* \* \* \*